(12) United States Patent
Tartakovsky et al.

(10) Patent No.: US 12,049,415 B2
(45) Date of Patent: Jul. 30, 2024

(54) DECENTRALIZED BIOSOLIDS CONVERSION SYSTEMS AND METHODS

(71) Applicant: EPIC CLEANTEC INC., San Francisco, CA (US)

(72) Inventors: Aaron Tartakovsky, San Francisco, CA (US); Igor Tartakovsky, San Francisco, CA (US)

(73) Assignee: EPIC CLEANTEC INC., San Francisco, CA (US)

( * ) Notice: Subject to any disclaimer, the term of this patent is extended or adjusted under 35 U.S.C. 154(b) by 260 days.

(21) Appl. No.: 17/108,935

(22) Filed: Dec. 1, 2020

(65) Prior Publication Data

US 2021/0171385 A1 Jun. 10, 2021

Related U.S. Application Data

(63) Continuation of application No. PCT/US2019/035614, filed on Jun. 5, 2019.
(Continued)

(51) Int. Cl.
*C02F 11/06* (2006.01)
*B01F 7/00* (2006.01)
(Continued)

(52) U.S. Cl.
CPC .......... *C02F 11/121* (2013.01); *B01F 27/112* (2022.01); *B01F 27/191* (2022.01);
(Continued)

(58) Field of Classification Search
CPC ...... C02F 1/20; C02F 1/42; C02F 1/66; C02F 1/72; C02F 1/02; C02F 9/00;
(Continued)

(56) References Cited

U.S. PATENT DOCUMENTS 3,272,740 A  9/1966 Gitchel et al.
3,589,313 A  6/1971 Smith et al.
(Continued)

FOREIGN PATENT DOCUMENTS

WO  WO-2013019444 A2  2/2013
WO  WO-2013090224 A2  6/2013
WO  WO-2019236724 A1  12/2019

OTHER PUBLICATIONS

PCT/US19/35614 International Search Report & Written Opinion dated Aug. 27, 2019.

*Primary Examiner* — Akash K Varma
(74) *Attorney, Agent, or Firm* — Wilson Sonsini Goodrich & Rosati

(57) ABSTRACT

Biosolids conversion systems and methods are provided. Wastewater may be received and separated into a separated water component and a dewatered solids component on-site at or near a wastewater source. The separated water components may be treated on-site using an ancillary water treatment process. The dewatered solids may be converted to a biosolid with aid of one or more oxidizers and a blending chamber. The dewatered solids may be converted to a biosolid on-site at or near a wastewater source or may be converted to a biosolid off-site at a central solids processing facility.

17 Claims, 6 Drawing Sheets

Related U.S. Application Data

(60) Provisional application No. 62/682,105, filed on Jun. 7, 2018.

(51) Int. Cl.

| | | |
|---|---|---|
| *B01F 7/04* | (2006.01) | |
| *B01F 15/00* | (2006.01) | |
| *B01F 27/112* | (2022.01) | |
| *B01F 27/191* | (2022.01) | |
| *B01F 27/70* | (2022.01) | |
| *B01F 35/21* | (2022.01) | |
| *B01F 35/22* | (2022.01) | |
| *B01F 35/221* | (2022.01) | |
| *C02F 11/121* | (2019.01) | |
| *B01F 101/00* | (2022.01) | |
| *C02F 103/00* | (2006.01) | |

(52) U.S. Cl.
CPC .......... *B01F 27/70* (2022.01); *B01F 35/2115* (2022.01); *B01F 35/2209* (2022.01); *B01F 35/22142* (2022.01); *C02F 11/06* (2013.01); *B01F 2101/305* (2022.01); *B01F 2215/0481* (2013.01); *C02F 2103/002* (2013.01); *C02F 2103/005* (2013.01); *C02F 2209/008* (2013.01); *C02F 2209/02* (2013.01); *C02F 2301/046* (2013.01)

(58) Field of Classification Search
CPC ......... C02F 11/121; C02F 11/06; C02F 11/00; C02F 11/12; C02F 2103/002; C02F 2103/005; C02F 2103/00; C02F 2209/008; C02F 2209/02; C02F 2209/005; C02F 2209/06; C02F 2301/046; E03F 5/14; B01F 27/112; B01F 27/191; B01F 27/70; B01F 27/71; B01F 27/80; B01F 35/2115; B01F 35/2209; B01F 35/22142; B01F 2101/305; B01F 2215/0481; B01F 7/04; B01F 7/00; B01F 7/00633; B01F 7/0025; B01F 15/00; B01F 15/00376; B01F 15/00175; B01F 15/00253
USPC ................................... 210/758, 175
See application file for complete search history.

(56) References Cited

U.S. PATENT DOCUMENTS

| | | |
|---|---|---|
| 3,687,646 A | 8/1972 | Albert et al. |
| 3,959,124 A | 5/1976 | Tchobanoglous |
| 4,264,352 A | 4/1981 | Houser |
| 4,543,190 A | 9/1985 | Modell |
| 4,971,690 A | 11/1990 | Justice |
| 5,462,676 A | 10/1995 | Pitts |
| 5,647,986 A | 7/1997 | Nawathe et al. |
| 6,024,226 A | 2/2000 | Olivier |
| 6,133,491 A | 10/2000 | Xing |
| 6,383,369 B2 | 5/2002 | Elston |
| 6,702,942 B1 | 3/2004 | Nield |
| 6,808,305 B2 | 10/2004 | Sharpe et al. |
| 6,863,826 B2 | 3/2005 | Sheets |
| 7,081,203 B2 | 7/2006 | Helm |
| 8,096,597 B2 | 1/2012 | Shoseyov et al. |
| 2003/0178375 A1* | 9/2003 | Sharpe .................... B01F 27/71 366/279 |
| 2012/0134231 A1* | 5/2012 | Lefebvre ................. B01F 27/80 366/279 |
| 2012/0200092 A1 | 8/2012 | Johnson et al. |
| 2015/0299009 A1* | 10/2015 | Tartakovsky ............. C02F 1/02 210/175 |

* cited by examiner

DECENTRALIZED BIOSOLIDS CONVERSION SYSTEMS AND METHODS

CROSS-REFERENCE

This application is a continuation application of International Application No. PCT/US19/35614, filed Jun. 5, 2019, which claims the benefit of U.S. provisional Patent Application No. 62/682,105, filed on Jun. 7, 2018, the entirety of which is entirely incorporated herein by reference.

BACKGROUND

In the United States there are approximately 15,000 wastewater treatment plants providing the most basic and critical infrastructure systems for protecting public health and the environment. These facilities are serviced by over 800,000 miles of public sewers and 500,000 miles of private lateral sewers connecting private property to public sewer lines. These vast and antiquated pipe networks are almost all in dire need of repair due to structural failure, blockages, and overflows.

While larger centralized systems have for decades helped to protect public health and preserve the environment, these systems are simply not keeping pace with rapid urbanization. It is estimated that at least $271 billion is needed to meet current and future demands. As city populations continue to grow and place greater demand on increasingly scarce water supply, utilities are forced to increase their rates in order to pay for repairs and new construction—in fact, 95% of spending on water infrastructure is made at the local level. Over the past few years, water prices have risen 6-7% each year in 30 major cities. Furthermore, this increased urban density only adds further strain on an already taxed infrastructure. As a result, sewer maintenance has increased exponentially in the last decade, making it more costly for new developments to tap into the sewer system in the form of sewer connection fees and impact fees. The American Water Work Association estimates that the cost of restoring underground pipes will total at least $1 trillion over the next 25 years, a figure that excludes the cost of constructing new infrastructure or repairing existing treatment plants.

SUMMARY

The present disclosure provides a decentralized wastewater treatment and biosolids conversion system that processes wastewater, such as processing wastewater from a high density building. Additionally, the systems described herein may use a chemical process to convert waste solids from wastewater into a biosolid. In some cases, solid components of wastewater may be removed and separated water may be sent to an ancillary water treatment area for reuse. In some cases, such as when wastewater is sourced from a high density building or at the district scale, an ancillary water treatment component may be provided to process separated water from the wastewater, with the processed separated water returned to the high density building for reuse.

In a first aspect, a wastewater treatment system is provided. The wastewater treatment system comprises a dewatering system for removing water from a wastewater stream, thereby producing dewatered solids having between 25% and 50% solids. The wastewater treatment system also comprises an oxidizing component for mixing said dewatered solids with an oxidizing chemical. The wastewater treatment system also comprises a blending chamber operably connected to said oxidizing component, said blending chamber having a plurality of blades that are configurable to alternate in more than one direction. Further, the wastewater treatment system comprises a collection component for receiving processed solids from said blending chamber.

In some embodiments, the wastewater treatment system additionally comprises a channel for diverting removed water from said dewatering system; a water treatment component; and a channel for returning water discharged from said water treatment component to a greywater consumption source.

In some embodiments, the blending chamber is configured to rotate blades between 50 RPM and 2000 RPM.

In some embodiments, the wastewater treatment system additionally comprises a computer processor in communication with said blending chamber, wherein said computer processor is programmed to adjust movement of said plurality of blades. In some embodiments, the computer processor is configured to adjust rotational direction of said plurality of blades. In some embodiments, the computer processor is configured to adjust rotational speed of said plurality of blades.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings, equations and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity. A better understanding of the features and advantages of the present invention will be obtained by reference to the following detailed description that sets forth illustrative embodiments, in which the principles of the invention are utilized, and the accompanying drawings (also "figure" and "FIG." herein), of which.

DETAILED DESCRIPTION

Figure 1:
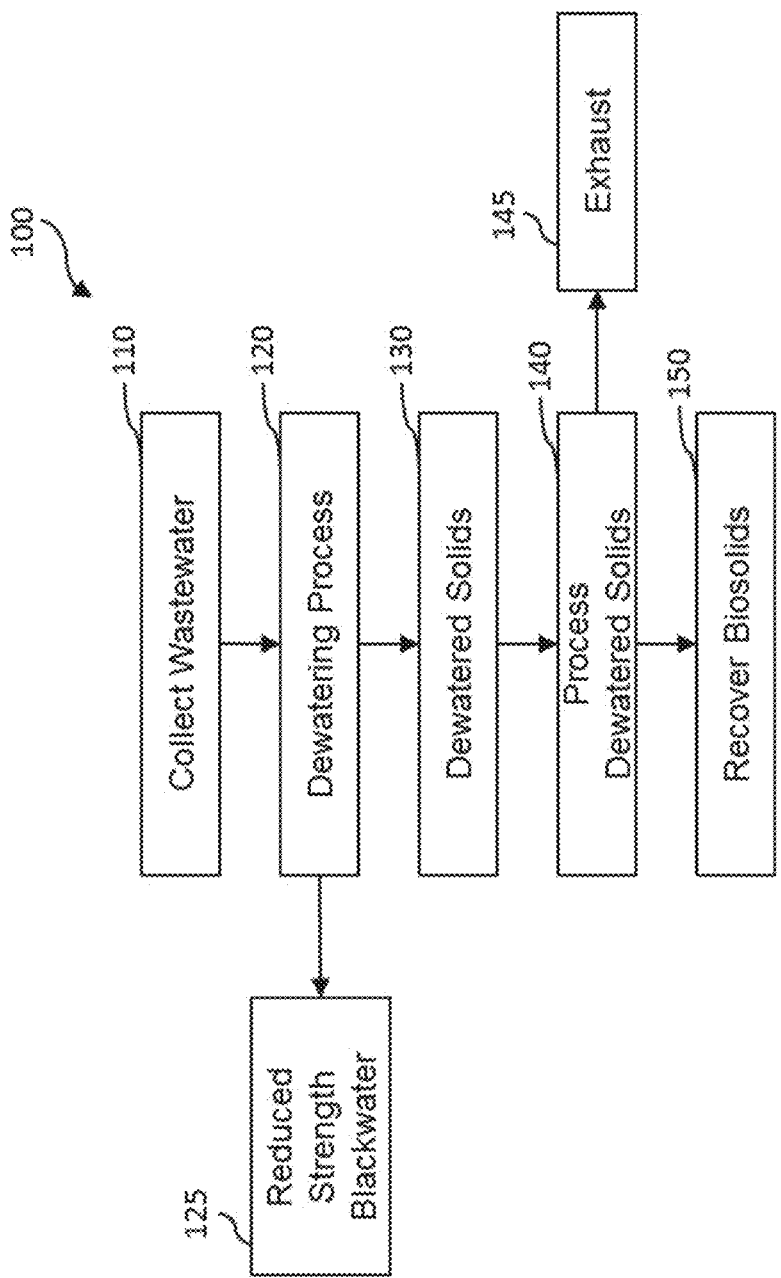
FIG. 1 illustrates a wastewater treatment and biosolids conversion process, in accordance with embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Wastewater may come from a source, such as a building or another type of structure. A building may be a residential building or a commercial building. A source of the water may be a high density building or other structure. A high density source may have a large number of water consumption sources. A high density source may have at least 5, 10, 15, 20, 30, 40, 50, 70, 100 or more water consumption sources within a structure. Examples of wastewater sources may comprise, but are not limited to, apartment buildings, townhouses, single family homes, office buildings, educational facilities, manufacturing facilities, medical facilities, government buildings, stores, or any other type of structure. Examples of water consumption sources may include toilets, sinks, showers, laundry machines, and dishwashers, among other examples.

Treatment of waste, or "wastewater," in urban environments, such as commercial and residential buildings, is a specific challenge. Wastewater is typically referred to in two classes—greywater and blackwater. Greywater, or "sullage," is defined as wastewater generated from sinks, showers, baths, laundry, dishwashers, and the like, which can be recycled on-site for uses such as toilet flushing, landscape irrigation, and constructed wetlands. Blackwater refers to the discharge from toilets—i.e., water containing human waste. Black water may comprise feces or urine (e.g., human or animal feces or urine). In some wastewater sources (e.g., commercial and residential buildings), grey-water and black-water are removed together, using a shared sewage system, to be treated at centralized waste treatment plants, before being returned to the environment at large. With anticipated increases in population and associated waste generation, waste management becomes one of the most critical aspects of sustainable development.

The present disclosure provides decentralized wastewater treatment and biosolids conversion systems and methods that process wastewater from sources, such as a high density building, and utilize a chemical process to convert solid, organic waste into a biosolid. In some instances, the biosolids may be a useful product, such as fertilizer or soil ammendment. In some instances, the biosolids may be an inert, non-bio-hazardous material. The resulting biosolid may be an odorless, pathogen-free, Class A-AEQ biosolid. In some examples, wastewater is processed by a dewatering component which separates the wastewater into waste solid components and separated water components. In some embodiments, the waste solids components may then be converted to biosolids on-site using an oxidizing component and/or a blending chamber. In some embodiments, the waste solid components may instead be transported off-site to be converted to biosolids in a specially designed waste solids processing facility.

Additionally, the process that is used for converting the solid, organic waste into a biosolid may be a chemical process. In particular, exposure to an oxidizing component may allow a solid, organic waste to be more completely processed and converted to a biosolid. In some examples, the chemical process may be an exothermic process. Some examples of an oxidizing component include potassium permanganate, potassium ferrate, and calcium oxide, in addition to other examples.

A wastewater treatment system as provided herein may be located substantially on-site. In some instances, portions of the wastewater treatment system may be located on-site while portions may be located at a remote central processing facility. Optionally, separation of wastewater into waste solid components and separated water components may occur on-site at or near the wastewater source (e.g., building). The separation may occur as a decentralized system. A solid waste product may be treated on-site or near the wastewater source, and/or may be treated at a remote central processing facility. The separated water components may undergo treatment on-site or near the wastewater source.

On-site activities may occur at a location that is within a wastewater source (e.g., building). The location may be partially within a wastewater source. The location may also be physically outside of a wastewater source but operably connected to the wastewater source so that the location is within, or connected to, the site of the wastewater source. For instance, the on-site activity may be on the same property of the wastewater source. The on-site activity may occur under the wastewater source. The on-site activity may occur underground. In some examples, activities may occur near a site. For example, activities (e.g., a solid waste product treatment) may occur within three blocks, within two blocks, within one block, within a hundred feet, within fifty feet, within forty feet, within thirty feet, within twenty feet, or within ten feet of the wastewater source (e.g., building) or a property on which the wastewater source resides.

In some examples, activities may occur at a central processing facility. For instance, waste solid components may be treated at a central processing facility. Alternatively, waste solid components may be treated on-site at the decentralized locations and a waste product may be taken to the central processing facility. The central processing facility may be a separate facility from the on-site or near activities. The central processing facility may optionally be not near to the site of the wastewater source. For example, the central processing facility may be more than three blocks, more than six blocks, more than a mile, more than two miles, more than three miles, more than five miles, more than ten miles, or more than twenty miles away from a site. The location of the central processing facility may be independent of a location of a wastewater source site. The central processing facility may receive materials from multiple sites. For example, the central processing facility may receive waste solid components and/or biosolids from multiple sites.

In some instances, separated water components from the wastewater may be sent to an ancillary water treatment component. In some cases, the ancillary water treatment component may be on-site or near the wastewater source (e.g., building). In some cases, the separated water component that is processed by an ancillary water treatment component may be reused at a wastewater source (e.g., within a building).

FIG. 1 illustrates a wastewater treatment and biosolids conversion process 100, in accordance with embodiments. At block 110, wastewater is collected. In some examples, wastewater may be collected from water consumption sources such as clothes washers, sinks, showers, and kitchens. Wastewater from one or more water consumption sources of one or more wastewater sources may be collected on-site or near the wastewater source.

At block 120, a dewatering process is conducted. The dewatering process may separate the collected wastewater into dewatered solids and separated water components. In some examples, dewatered solids that are separated from the separated water components may comprise around 70% water. As seen in FIG. 1, the dewatering process 120 results in separated water components of reduced strength blackwater 125 and dewatered solids 130. The separated water components of reduced strength blackwater 125 may be processed at an ancillary water processing component. Dewatered solids 130 may be kept on-site for processing or may be transported off-site for processing.

At block 140, dewatered solids are processed. In some examples, the dewatered solids are processed on-site. In some examples, the dewatered solids are processed through a chemical process using a blending chamber. The dewatered solids may be processed through a chemical process that is an exothermic reaction. Water components of the waste solids may be turned into exhaust 145 or may be reclaimed in another process (not shown). Additionally, the processing of the dewatered solids may produce biosolids 150.

In some examples, the dewatered solids are processed off-site. In some examples, the dewatered solids are processed at a waste solids processing facility. In these examples, waste solids may be provided to transportation bags directly after coming through the dewatering process. In some instances, the waste solids may or may not undergo some processing on-site before being provided to a transportation bag. For instance, waste solids may be transported via a screw conveyor and/or have an oxidizing agent applied before being provided to a transportation bag. The transportation bags that contain the dewatered solids may then be transported to an off-site waste solids processing facility. The waste solids processing facility may receive the dewatered solids and provide further processing, as described in greater detail elsewhere herein. The dewatered solids process results in exhaust 145 and recovered biosolids 150.

Figure 2:
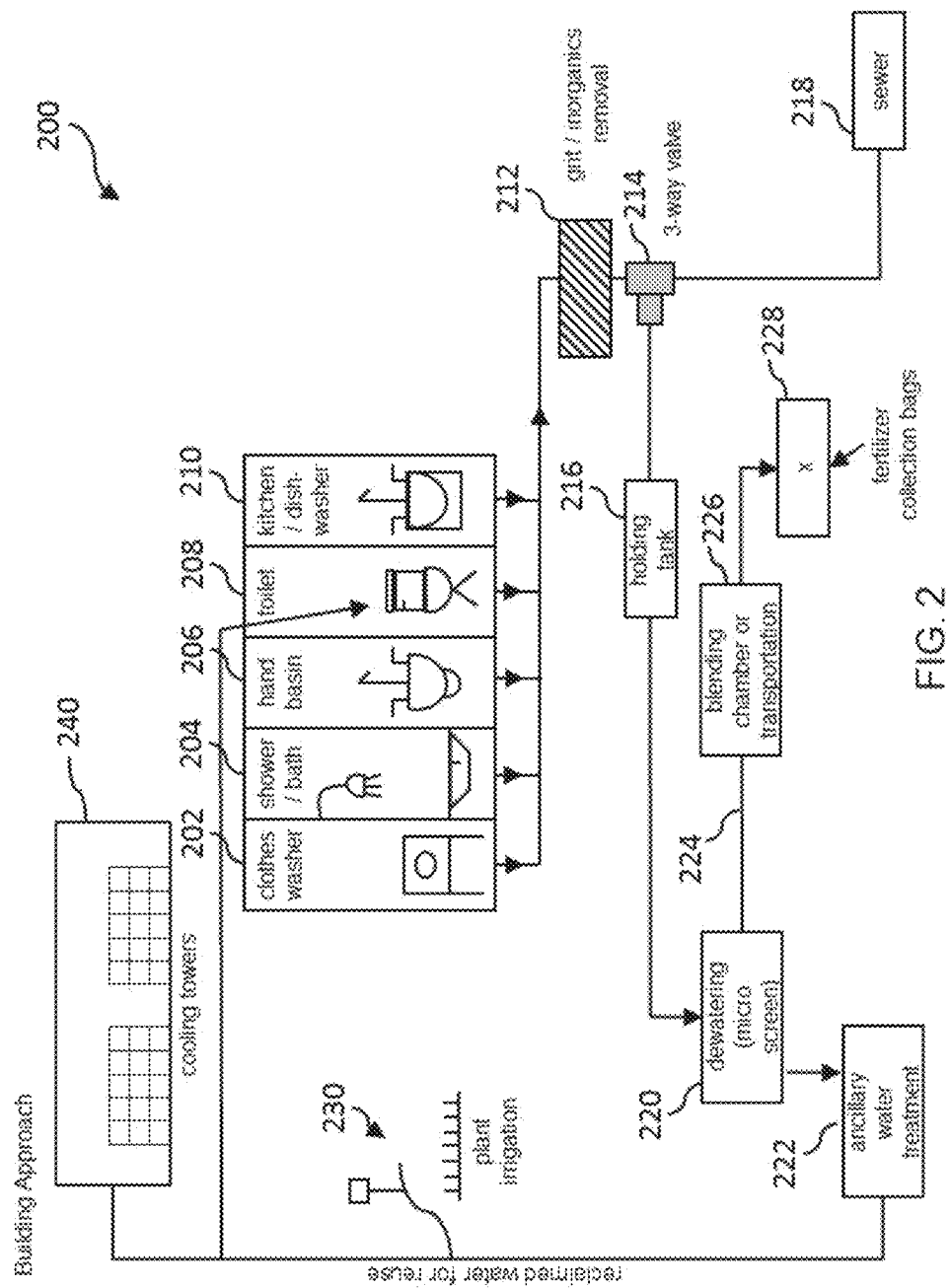
FIG. 2 illustrates a building approach that incorporates decentralized wastewater treatment processes, in accordance with embodiments.

FIG. 2 illustrates a building approach that incorporates decentralized wastewater treatment and biosolids conversion processes 200, in accordance with embodiments. Wastewater (e.g., greywater or blackwater) from a source, such as a building, may be collected in a central holding tank on-site (e.g., in or near the building). The wastewater may be collected from different portions of the building via sanitary plumbing pipes (e.g., risers). As seen in FIG. 2, wastewater may be provided from water consumption sources such as clothes washer 202, shower/bath 204, hand basin 206, toilet 208, and kitchen/dishwasher 210.

Before the wastewater enters a treatment process, the wastewater may initially pass through a grit screening process 212. The grit screening process may be used to remove inorganic objects that are above a size threshold. For example, a grit screening process may remove inorganic material that is more than the size of golf ball or a baseball. In some embodiments, the grid screening process may remove materials that have a maximum dimension (e.g., length, width, height, diagonal, diameter) of greater than or equal to about 0.1 cm, 0.5 cm, 1 cm, 1.5 cm, 2 cm, 2.5 cm, 3 cm, 3.5 cm, 4 cm, 5 cm, 7 cm, or 10 cm. The materials may comprise inorganic or organic solid materials. The grit screening process may remove inorganic objects that are improperly flushed down a toilet. For example, the grit screening process may be used to remove inorganic objects such as children's toys, wrappers, or other materials that improperly flushed down a toilet. In some cases, a grit screening process may utilize one or more screens. The screens may be selected from the group consisting of a bar screen, a coarse screen, and a fine screen. In some instances a single screen may be used to capture the large materials. Alternatively, a plurality of screens may be provided in series or in parallel. Once the larger objects are removed from the wastewater, the objects may be discharged to the sewer. In another example, once the objects are removed from the wastewater, the objects may be collected periodically. In a further example, once the larger objects are removed from the wastewater, the objects may be disposed of periodically.

Once the larger objects (e.g., inorganic objects) have been screened from the wastewater, a three-way valve 214 may be used to divert the wastewater flow into a treatment process. Initially, wastewater may be held in a holding tank, such as a holding tank 216 as illustrated in FIG. 2. In some examples, a holding tank may be used to keep excess wastewater at bay if the treatment process is at its capacity. In some examples, the three-way valve 214 may also be used as an emergency bypass to the sewer 218. In examples, if a treatment process is at its capacity, and a holding tank is full, excess wastewater from a building may be released to the sewer using the emergency bypass.

The wastewater may then be pumped through a dewatering device 220. In some cases, the dewatering device may be an automated dewatering device. In some cases, the automated dewatering device may comprise a microscreen. A dewatering device may have varying dimensions based on a size of a building. In some examples, a dewatering device may have a footprint that is approximately five feet by six feet. In some examples, the foot print of the dewatering device may be less than five feet by six feet. A dewatering device may include additional components include, but not limited to, filter presses, dewatering centrifuges, and/or other types of mechanical sludge dewatering components. In examples, equipment that is used will not require the additional of polymers.

The dewatering device may separate the wastewater into waste solids and separated water components. The separated water components may comprise greywater. In examples, the separated water components may be provided to an ancillary water treatment process 222. The ancillary water treatment process may optionally occur on-site, at or near a wastewater source. In some instances, pipes may convey separated water components from the dewatering device to the ancillary water treatment process. The ancillary water treatment process may treat the separated water components so as to reclaim the water components for reuse. In some examples, reclaimed water may be treated in a "fit-for-purpose" manner. In some examples, reclaimed water that is treated in a "fit-for-purpose" manner may be treated to either potable or non-potable standards as determined by the final intended use. In examples, reclaimed water may be provided to grounds 230 for plant irrigation. In examples, reclaimed water may be provided to toilet 208 for reuse. In some instances, the reclaimed water may be used for other water consumption sources that may accommodate the use of treater water. In examples, reclaimed water may be provided to cooling towers 240. In some examples, reclaimed water could also potentially be used for clothes washing.

Additionally, the dewatering device may remove suspended solids from the wastewater. For example, a microscreen may collect solid waste materials while allowing separated water components to pass through. In some examples, the microscreen may push solid waste materials off to the side so as to form a dewatered solid, such as a dewatered cake. The dewatered solids that result from the dewatering process may be approximately 30%-40% solids. In some cases, the dewatered solids may be less than 25% solids, 26% solids, 27% solids, 28% solids, 29% solids, 30% solids, 31% solids, 32% solids, 33% solids, 34% solids, 35% solids, 36% solids, 37% solids, 38% solids, 39% solids, 40% solids, 41% solids, 42% solids, 43% solids, 44% solids, 45% solids, 46% solids, 47% solids, 48% solids, 49% solids, 50% solids, 51% solids, or more than 51% solids. Optionally, the dewatered solids may have a solids percentage greater than any of the values provided, or falling within a range between any two of the values provided. In some examples, it is beneficial for dewatered solids to have a substantial remaining portion of water content so as to prevent blockages. In some cases, the dewatered solids may be free of added polymers. In some examples, the dewatered solids may be substantially free of inorganic compounds. In some examples, the dewatered solids may be more that 50% organic, more than 60% organic, more than 70% organic, more than 80% organic, more than 85% organic, more than 90% organic, more than 91% organic, more than 92% organic, more than 93% organic, more than 94% organic, more than 95% organic, more than 96% organic, more than 97% organic, more than 98% organic, more than 99% organic, or substantially 100% organic.

In some embodiments, the dewatered solids may be treated on-site in a decentralized fashion. Alternatively, the dewatered solids may be collected and treated at a central processing facility.

Figure 6:
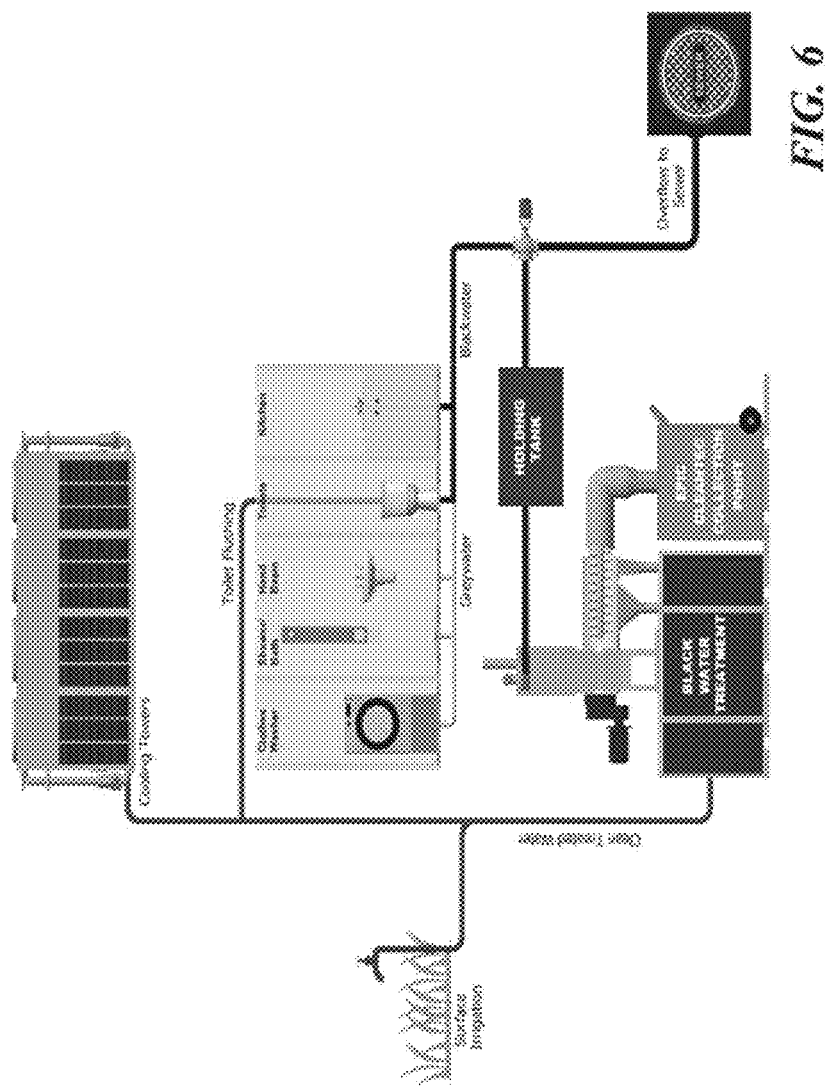
FIG. 6 illustrates a wastewater treatment and biosolids conversion and extrusion process, in accordance with embodiments.

The dewatered solids may progress from the automated dewatering device to a conveyance mechanism, such as a screw conveyer 224. The conveyance mechanism may be any mechanism that may be capable of transporting the dewatered solids to another location, such as a screw conveyor, conveyor belt, chute, a pipe, or any other conveyance mechanism. The conveyance mechanism may or may not cause mixing of the dewatered solids. In some examples, solids may be transported in specially designed transportation boxes, IBCs (intermediate bulk containers), and/or specially designed drums. In some cases, a microscreen from the dewatering device may have an outlet that leads to a side portion where the solids are squeezed onto the conveyance mechanism, such as a screw conveyor. FIG. 6 illustrates the extrusion of dewatered solids. In particular, dewatered solids may be extruded following a biosolid conversion process such as the biosolid conversion process illustrated in FIG. 1. In some cases, the resulting solids that form a dewatered solid may be transferred directly from a dewatering device to a conveyance mechanism, such as a screw conveyor. In some cases, the resulting solids that form a dewatered solid may fall from an outlet of the dewatering device to the conveyance mechanism, such as the screw conveyer. In some examples, dewatered solids may fall from an outlet via gravity. In some examples, dewatered solids may fall from an outlet via a mechanical mechanism. For example, a rotating paddle may sweep solids to the outlet.

Dewatered solids are transported from the dewatering device onto a conveyance mechanism. From this point, the dewatered solids may be provided to an on-site biosolids conversion process or may be transported to an off-site waste solids conversion facility. An example of handling of dewatered solids that are transported to an off-site waste solids processing facility is described in FIG. 3 below.

When dewatered solids are converted to biosolids on-site, the dewatered solids may be provided to an on-site blending chamber 226. The dewatered solids may be automatically dosed with one or more chemicals. In some instances, the chemical dosing may occur while the dewatered solids are transported from the dewatering device to the blending chamber via a conveyance mechanism. Alternatively, the dosing may occur before the dewatered solids are placed on the conveyance mechanism or after the dewatered solids have left the conveyance mechanism. In one example, the conveyance mechanism (e.g., screw conveyer) may comprise an automated chemical dosing technology. In some cases, the automated chemical dosing technology may dose the dewatered, organic solids with an oxidizer as the dewatered organic solids are transported across the conveyance mechanism. In some cases, the organic solids may be exposed to an oxidizer that is in the form of a free flowing chemical. In some cases, the oxidizer may be provided to the dewatered solids in other forms, such as a mist, a measured liquid, a periodic liquid form, or another form of delivery. In some examples, an oxidizer may be provided to dewatered solids through a spray system that is along the conveyance mechanism (e.g., screw conveyor). In some cases, the chemical dosing technology (e.g., an automated hopper) may provide a predetermined amount of chemical to the dewatered solids based on the amount of dewatered solids. As the dewatered solids travel along the conveyance mechanism, the chemical may be mixed. In some instances, the conveyance mechanism itself may aid in the mixing. For instance, a screw conveyor may aid in mixing the chemical (e.g., oxidizer) with the dewatered solids. In some cases, the dewatered solids may be thoroughly mixed. Alternatively, the dewatered solids may be only partially mixed while traversing the conveyance mechanism. In an example, a ratio by weight of chemicals to solids may be less than 1%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, or more than 30%. An exothermic reaction may or may not occur while the dewatered solids are transported along the conveyance mechanism. One or more sensors may be provided along the conveyance mechanism. The one or more sensors may monitor amount of dewatered solids on the conveyance mechanism, temperature, pH, or any other characteristics as provided elsewhere herein.

The combined dewatered solid-chemical mixture may be introduced into a blending chamber 226. The dewatered solid-chemical mixture may or may not be premixed before entering the blending chamber. In some cases, the combined dewatered solid-chemical mixture may be provided to an opening at the top of the blending chamber. In some cases, the dewatered solid-chemical mixture (also known as the "solids mixture") may be provided to a closest portion of the blending chamber based on the position of the solids mixture to the blending chamber. For example, the blending chamber may comprise an inlet that receives the solid mixture from the conveyance mechanism.

Once the solids mixture enters the blending chamber, blades within the blending chamber may begin to rotate. Optionally, the blades may be rotating as the solids mixture enters the blending chamber. In some examples, the blades may rotate in an alternating sequence. In some examples, the alternating sequence may be predetermined. In some examples, the alternating sequence may be randomized. Alternatively, the rotating of the blades need not be in alternating directions but may remain in substantially the same direction. In some cases, the predetermined sequence of blades within the blending chamber may alternate between 50 RPM and 2000 RPM. In some cases, the predetermined blades may rotate at less than 50 RPM, at 50 RPM, at 60 RPM, at 70 RPM, at 80 RPM, at 90 RPM, at 100 RPM, at 110 RPM, at 120 RPM, at 130 RPM, at 140 RPM, at 150 RPM, at 160 RPM, at 170 RPM, at 180 RPM, at 190 RPM, at 200 RPM, at 210 RPM, at 220 RPM, at 230 RPM, at 240 RPM, at 250 RPM, at 300 RPM, at 350 RPM, at 400 RPM, at 450 RPM, at 500 RPM, at 550 RPM, at 600 RPM, at 650 RPM, at 700 RPM, at 750 RPM, at 800 RPM, at 850 RPM, at 900 RPM, at 950 RPM, at 1000 RPM, at 1050 RPM, at 1100 PRM, at 1150 RPM, at 1200 RPM, at 1250 RPM, at 1300 RPM, at 1350 RPM, at 1400 RPM, at 1450 RPM, at 1500 RPM, at 1550 RPM, at 1600 RPM, at 1650 RPM, at 1700 RPM, at 1750 RPM, at 1800 RPM, at 1850 RPM, at 1900 RPM, at 1950 RPM, at 2000 RPM, at 2050 RPM, at 2100 RPM, at 2150 RPM, at 2200 RPM, at greater than 2200 RPM, or at a combination of the above RPM's. The blades may rotate at a speed less than any of the values provided herein, above any of the values provided herein, or within a range falling between any two of the values of provided herein. The blades may rotate a clockwise or counterclockwise direction. In some instances, the blades may alternate rotating between a clockwise and counterclockwise direction. Optionally, a single set of blades may be provided. In some instances, a plurality of blades may be provided, rotating in the same direction, at different speeds or the same speeds. In other instances, a plurality of blades may be provided rotating in different directions, at different speeds or the same speeds. In some cases, the speed of the blade rotation may be based on characteristics of the solids mixture. In example, the solids mixture may be exposed to the rotating blades of the blending chamber until the solids mixture is thoroughly mixed.

In some examples, a mixer in the blending chamber may be a special-purpose multi-directional mixer that is designed to achieve chemical processing and mechanical operation. In some examples, the mixer may utilize paddles and/or blades to move material from the entry point of the blending chamber to the point of discharge of the blending chamber. In some examples, desired mixing may be achieved with a speed that ranges from 100 rpm to 2500 rpm. At these speeds, the material that is blended can move from the entry point of the blending chamber to the discharge point of the blending chamber in as quickly as 3 seconds. In some examples, continued operation may result in the build-up of mixing materials on the discharge side of the blending chamber, which may result in excessive load on the motor shaft in excess of torque capacity of the motor. By automating the mixer in the blending chamber to move the mixing materials back and forth, motor overload may be avoided.

Additionally, an exothermic reaction to completely process waste may last between three minutes and five minutes. In particular, using methods and systems provided herein, this may be achieved without the use of excessively long mixing chambers and shafts, increased numbers of shaft supports with internal bearings, heavy-duty electrical motor with larger HP, and increased energy use. Methods and systems provided herein utilize control sequencing by changing direction of the rotation, thereby achieving a multi-pass approaching within the mixing chamber.

The solution was to utilize control sequencing by changing direction of the rotation, thus achieving multi-pass approach within the mixing chamber While the solids mixture is being mixed in the blending chamber, an exothermic reaction may occur. Sensors within and outside of the blending chamber may be used to measure characteristic of the exothermic reaction. For example, sensors within the blending chamber may measure pH of the blending process. In additional cases, sensors within the blending chamber may measure temperature of the blending process. In some cases, as the solids mixture is thoroughly mixed within the blending chamber, an exothermic process may result in the blended solids mixture reaching 70 C to 100 C. In some cases, the blended solids mixture may reach at least 70 C, 75 C, 80 C, 85 C, 90 C, 95 C, 100 C, 105 C, 110 C, or more than 110 C. In some examples, the blending process may be performed as a continuous mixing process. In some examples, the blending process may be performed as a batch process. In some examples, the blending process may be performed as a batch process that is run in continuing sequences. In some cases, the blended solids may be blended thoroughly and monitored to determine temperature of the blended solids as well as how long the blended solids have been at a particular temperature. Processes used herein may be tailored to have the blended solids reach a particular temperature, such as a temperature required by the Environmental Protection Agency (EPA) Biosolids Management Handbook. Additionally, processes used herein may be tailored so as to hold blended solids at or above the threshold temperature for a threshold amount of time. For instance, the blended solids should be maintained at or above the threshold temperature of at least 5 seconds, 10 seconds, 30 seconds, 1 minute, 2 minutes, 3 minutes, 5 minutes, 10 minutes, 15 minutes, 20 minutes, 30 minutes, 1 hour, 90 minutes, 2 hours, 3 hours, 4 hours, or 6 hours. Sensors may be used to determine temperature of blended solids as well as an amount of time the blended solids have been at or above a threshold temperature. In some instances a clock may be provided that may aid in keeping track of time and/or the amount of time that has elapsed.

While the solids mixture is being blended in the blending chamber, steam may be produced by the blending process. In some cases, steam may be exhausted out of the blending chamber. For example, the steam may be exhausted out of the blending chamber through a conventional exhaust system. In some cases, the steam may be exhausted through a conventional exhaust system integrated within a building. In some cases, the steam produced during blending of the solids mixture may be captured for further treatment and/or reused. In some cases, a portion of the steam that is produced by the blending process may be exhausted and a portion of the steam produced by the blending process may be recaptured. In some cases, an exhaust fan may be included in connection with the blending chamber.

Once the blended solids are thoroughly mixed, and/or once the blended solids have been at or above a threshold temperature for a threshold amount of time, the blended solids may be transferred to a holding container. In some instances, when the blended solids are thoroughly mixed, and/or once the blended solids have been at or above a threshold temperature for a threshold amount of time, a discharge valve may be openable. In some case, the discharge valve may be automatically opened once the blended solids have been the threshold time and temperature conditions. In some cases, once the discharge valve has been opened, the generated biosolids may be transferred to the holding container. In some cases, the biosolids may be dropped into a self-weighing container. In some cases, the biosolids may be dropped into fertilizer collection bags 228. Once the biosolids have been provided to a container, the solids may be collected on a regular basis. In some cases, the solids may be bagged. In some instances, the solids may be blended in a batch process. The solids may be received at the container when the batch process has been completed. In some cases, conditions related to the functioning of the process mechanical aspects such as valves, pumps, sensors, etc., may be controlled remotely. Further details are provided elsewhere herein regarding remote control of the process.

The solids exiting the blending chamber may be biosolids. In some cases, the biosolids may be collected and/or transported by a waste management company. In some cases, once a threshold amount of biosolids have been generated, an alert may be sent to the waste management company. The alert may notify the waste management company to pick up the generated biosolids. The waste management company may dispose of the biosolids. The biosolids may be safe to be disposed without requiring any additional treatment. In some instances, the biosolids may be reusable. Optionally, the biosolids may suitable for use as a fertilizer or other uses.

Figure 3:
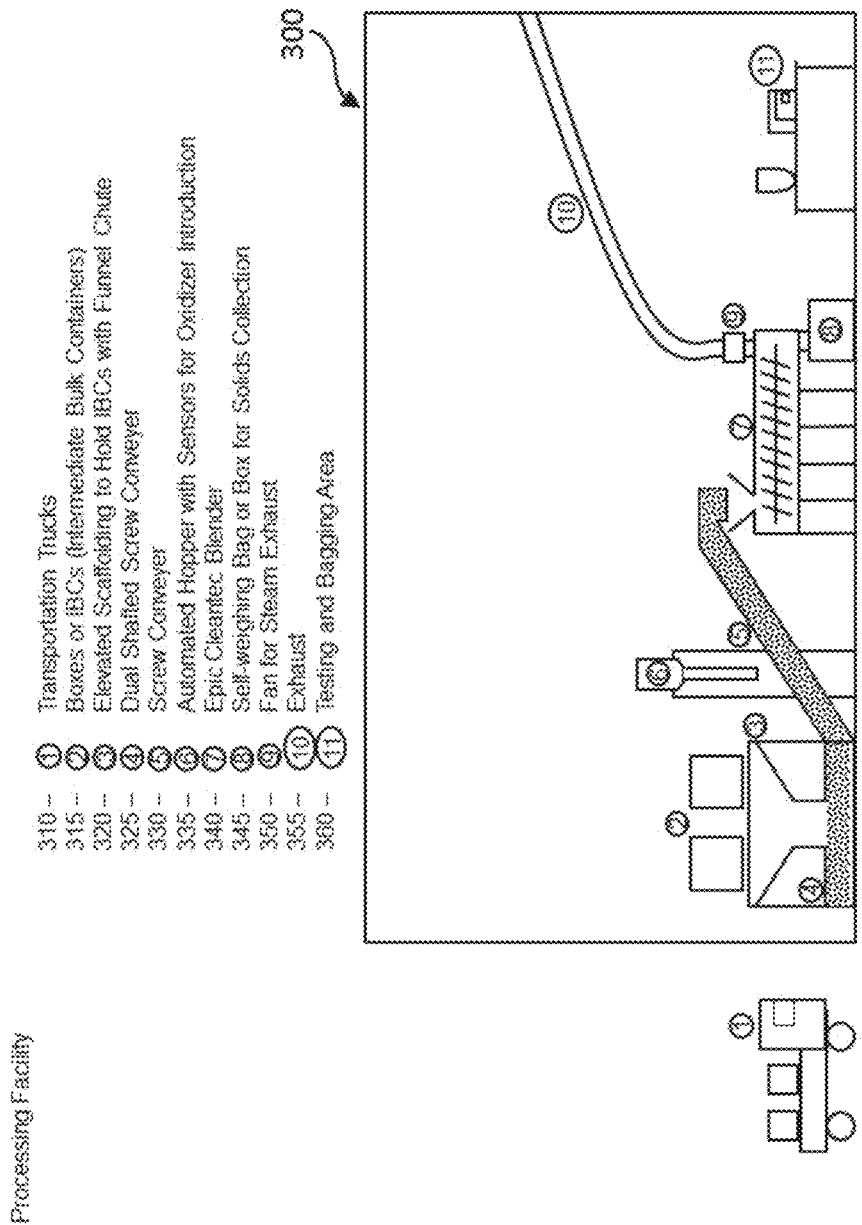
FIG. 3 illustrates a waste solids processing facility, in accordance with embodiments.

As previously described, in some embodiments, the dewatered solids may be collected and treated at a central processing facility, such as a dewatered solids processing facility. FIG. 3 illustrates a dewatered solids processing facility, in accordance with embodiments. In particular, FIG. 3 provides transportation trucks 310, intermediate bulk containers 315, elevated scaffolding 320, dual shafted screw conveyer 325, screw conveyor 330, oxidizer introduction component 335, blending chamber 340, bag for biosolid collection 345, fan for steam exhaust 350, exhaust 355, and area 360 for testing and bagging.

In some cases, dewatered solids may be produced using a dewatering device. As discussed above, some examples of dewatering devices may include a microscreen so as to produce dewatered solids. In some instances, the dewatering device may be a dewatering device 220 as described in FIG. 2. The dewatering device may be provided on-site at or near a wastewater source.

In some cases, the dewatered solids may be collected into an intermediate bulk container 315. The dewatered solids may be conveyed from the dewatering device to the intermediate bulk container. Optionally, the dewatered solids may drop directly into the intermediate bulk container. For example, an outlet may be provided beneath the dewatering device that may allow the dewatered solids to drop into the intermediate bulk container. In another example, the dewatered solids may be conveyed to the intermediate bulk container with aid of a conveyance mechanism. The conveyance mechanism may be a screw container or any other type of conveyance mechanism described elsewhere herein. Chemicals (e.g., oxidizer) may or may not be added to the dewatered solids while conveyed on the conveyance mechanism. The conveyance mechanism may or may not have any characteristics of a conveyance mechanism described elsewhere herein. The collected dewatered solids may then be transported to a processing facility through the use of transportation vehicles 310. The transportation vehicles may be trucks or other vehicles that may be capable of carrying one or more of the intermediate bulk containers. In some examples, the dewatered solids may be cooled so as to limit or decrease biological activity within the dewatered solids. The dewatered solids may or may not be cooled prior to being loaded onto the transportation vehicles. In some cases, the transportation vehicles 310 may be cooled. For instance, the transportation vehicles may comprise an air conditioning unit that may keep the dewatered solids within the containers cooled to a desired temperature. For instance, it may be desirable to keep the dewatered solids below 0 degrees C., 5 degrees C., 10 degrees C., 15 degrees C., 20 degrees, C, 25 degrees C., 30 degrees C., 35 degrees C., 40 degrees C., 45 degrees C., 50 degrees C., 60 degrees C., 70 degrees C., or 80 degrees C. prior to or during transport of the solids.

Once the dewatered solids within the intermediate bulk containers (IBCs) 315 arrive at a processing facility, the IBCs 315 may be transferred to an elevated structure 320. The IBCs, when engaged with the elevated structure, may release the dewatered solids into a collection area. In some case, a bottom wall of the IBCs may be opened, thereby allowing the dewatered solids to drop into the collection area. In some instances, the transfer of the IBCs off the truck may be performed manually or with aid of one or more automated mechanisms. The removal of the dewatered solids from the IBCs to the collection area may occur manually or with aid of one or more automated mechanisms. The dewatered solids that are dropped into the collection area may be funneled into a central collection zone. The dewatered solids may be removed from the IBCs and transferred to a central collection zone.

The dewatered materials may be moved from the central collection zone to a blending chamber. The dewatered materials may be moved to the blending chamber with aid of a conveyance mechanism. The conveyance mechanism may be a screw conveyor or any other type of conveyance mechanism described elsewhere herein. The conveyance mechanism may have any characteristics of a conveyance mechanism as described elsewhere herein. For example, the conveyance mechanism may allow a chemical (e.g., oxidizer) to be added to the dewatered solid. The conveyance mechanism may or may not provide mixing of the chemical and dewatered solid.

In some examples, the bottom of the collection zone may have a dual-shafted screw conveyor 325. The dual-shafted screw conveyor may move the dewatered solid into a subsequent screw conveyor 330. Additionally, once the dewatered solid is engaged on the screw conveyor 330, the dewatered solid may be dosed with a chemical, such as an oxidizer. The oxidizer may be any type of oxidizer or have any characteristic as described elsewhere herein. In some examples, the dewatered solid may be dosed with an oxidizer chemical using an oxidizer introduction component 335. In some examples, the dewatered solid may be automatically dosed with an oxidizer chemical. For instance, the chemical may be introduced via a spray or drop system. The screw conveyor may or may not cause some mixing of the dewatered solids and the chemical.

Once the dewatered solids have been dosed with an oxidizer chemical, thereby forming a solids mixture, the solids mixture may be introducing into a blending chamber 340. The solids mixture may be blended thoroughly in the blending chamber 340. The blending chamber may have any characteristic of a blending chamber described elsewhere herein. The blending may cause an exothermic reaction. In some instances, the blending may create a steam exhaust byproduct. The steam exhaust 355 may be vented using a fan 350, or may be recaptured.

The blending of the dewatered solids and the chemicals within the blending chamber may produce biosolids. In some instances, the blending may cause the temperature of the solids mixture to rise. Optionally, the blending chamber may retain the solids mixture until a threshold temperature has been reached. In some instances, the blending chamber may retainer the solids mixture until the threshold temperature has been reached for a threshold length of time. Optionally, sensors may be provided, as provided in greater detail elsewhere herein. Additionally, the resulting biosolids that are produced by blending the solids mixture may be captured within a container, such as a bag or a box for biosolid collection 345. The container may optionally be a self-weighing bag or box. When a threshold weight has been collected within the container, the container may not receive any more biosolids and a new container may be provided to receive biosolids.

Once the biosolids are collected, the biosolids may be transported to an area 360 for testing and bagging. In some instances, the biosolids may be tested to determine whether the biosolids are pathogen-free. In some instances, biosolids from each container may be tested. Alternatively, biosolids from selected containers may be tested. In some instances, the selection of the containers may be random. The biosolids may be bagged. The biosolids may then be collected by a waste management company. The biosolids may be safely disposed of, or may be reused for certain applications, as described in greater detail elsewhere herein.

Additional aspects of the invention as provided herein include improvements to a blending chamber. Such improvements may apply to an on-site blending chamber at or near a wastewater source, or an off-site blending chamber at a central processing facility. In particular, FIG. 4A illustrates a blending chamber having an extended length, in accordance with embodiments. By extending the length of a blending chamber, a capacity for the blending chamber is increased which in turn allows for greater mixing of components, such as organic solids and an oxidizer component. For instance, if a previously known blending chamber had a length L, an improved blending chamber may have a length greater than L, such as 2L.

Figure 4B:
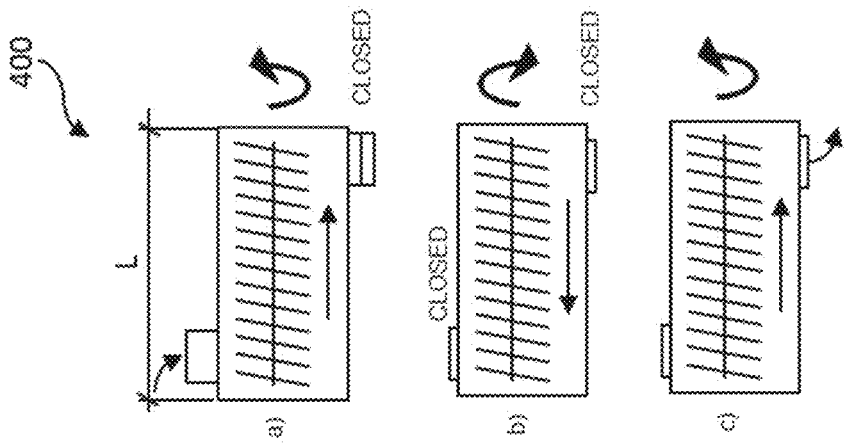
FIG. 4B illustrates a blending chamber having alternating rotation directionality, in accordance with embodiments.
Figure 4A:
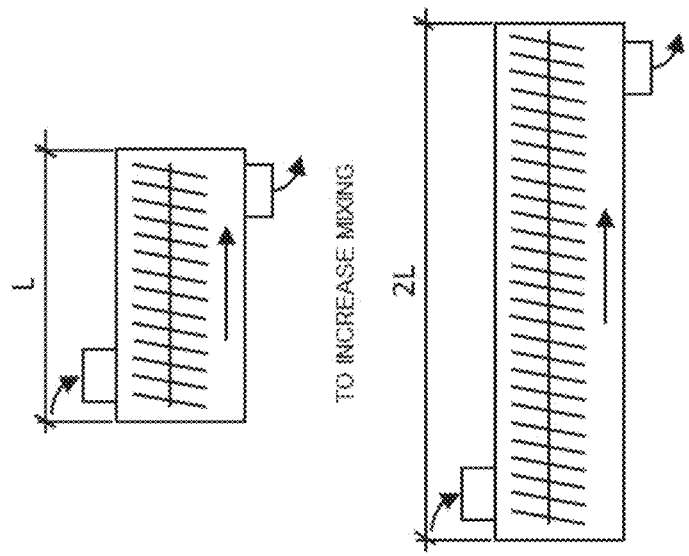
FIG. 4A illustrates a blending chamber having extended length, in accordance with embodiments.

Additionally, FIG. 4B illustrates a blending chamber having alternating rotation directionality, in accordance with embodiments. In one example, as shown in step (a), the blades may initially be rotating in a first direction when the inlet is open, and the outlet is closed, allowing a solids mixture to enter the blending chamber but not leave the blending chamber. In step (b), the inlet and outlets may both be closed, preventing solids from entering or leaving the blending chamber. The blades may rotate in a second direction different from the first direction. In step (c), the inlet may be closed and the outlet may be opened, permitting solids to leave the blending chamber, but not exit the blending chamber. The blades may be rotating in the first direction again. Any number or sequence of direction changes of blades may occur. For instance, one direction change, two direction changes, three direction changes, four direction changes, five direction changes, six direction changes, seven direction changes, eight direction changes, nine direction changes, ten direction changes or more may occur during the blending process for a given batch of a solids mixture. The blades may rotate at any speed or sequence of speeds as described in greater detail elsewhere herein. The blades may or may not be rotating while solids are entering or exiting the blending chamber. By adding alternating rotations in different directions, multiple passes of mixing materials may be provided.

Increasing the directions of rotation may improve the blending of components within a blending chamber without extending a length of the blending chamber. For example, an increase of rotational direction may be sufficient to blend components to a desired degree of mixedness. Increasing the directions of rotation may also result in a more thorough blending than when components are blended with unidirectional rotation. In some cases, increasing the degrees of rotation increases the blending of less-blended materials with more-blended materials so that the overall composition of materials reaches a more uniform degree of blending. Along these lines, in addition to increasing the degree of blending between materials, the increased rotational directions may also increase the exothermic reaction that results from the blending of materials. Further, when increasing the degrees of rotation, the blending chamber may stay the same size or even have a reduced capacity while achieving a desired degree of mixedness, which in turn may improve heat retention by reducing the overall surface area of the blending chamber interior. Further, by having additional degrees of rotation, less horsepower may be required to drive the blending process. Further, maintenance within the chamber may be reduced by lessening or eliminating additional brackets and bearings that may be needed to support long shafts.

Increasing length of the blending chamber and/or alternating direction of rotation may permit a more thorough mixing of the solids and chemicals within the blending chamber. The level of mixing may be improved by at least 5%, 10%, 15%, 20%, 25%, 30%, 40%, 50%, 60%, 70%, 80%, 90%, 100%, or more for a given time period. In some instances, this may allow the blending chamber to achieve a thorough mixture more quickly. This may allow the blending chamber to achieve a desired level of mixedness in at least 5%, 10%, 15%, 20%, 25%, 30%, 40%, 50%, 60%, 70%, 80%, or 90% less time.

In a further embodiment, a blending chamber may have both extended length as well as alternating rotation directionality.

Computer Systems

Figure 5:
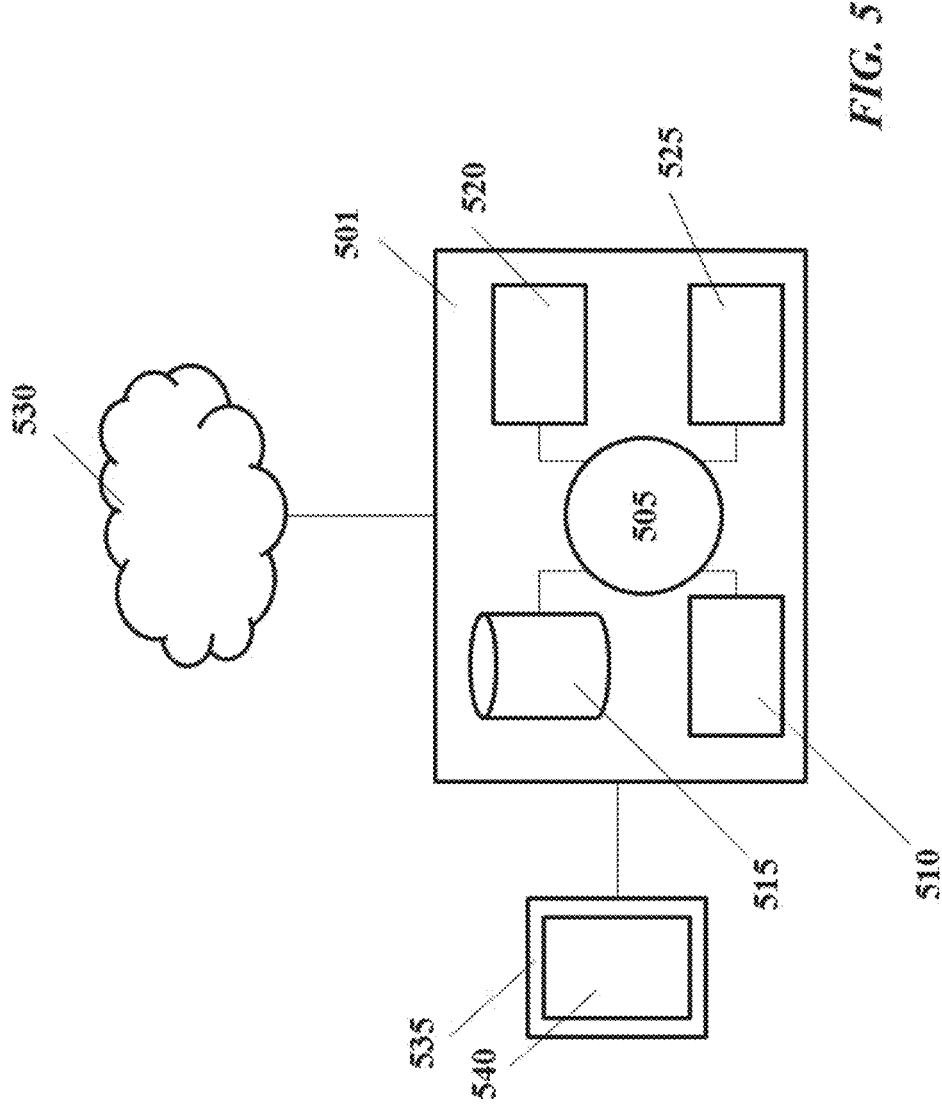
FIG. 5 shows a computer control system that is programmed or otherwise configured to implement methods provided herein.

The present disclosure provides computer control systems that are programmed to implement methods of the disclosure. FIG. 5 shows a computer system 501 that is programmed or otherwise configured to convert wastewater components and/or dewatered solids into biosolids. The computer system 501 can regulate various aspects of the present disclosure, such as, for example, controlling process aspects of system described herein. For example, the computer system 501 can regulate valves, sensors, pumps, and other aspects of the biosolids conversion system. The computer system 501 may use the regulation of particular aspects of the biosolids conversion system to optimize processing of wastewater, dewatered solids, and generated biosolids. The computer system 501 can be an electronic device of a user or a computer system that is remotely located with respect to the electronic device. The electronic device can be a mobile electronic device.

In one example, a remote user may interact with the computer system. The remote user may be remote to one or more wastewater sources, and/or a waste solids processing facility. In some instances a user may be at one or more wastewater sources (e.g., building) or a waste solids processing facility.

The user may be able to remotely monitor a status of the biosolids conversion system. The user may or may not be able to monitor sensor data from one or more sensors provided at the system. One or more sensors may be provided at a water consumption source, along the plumbing, at a grit screening process, at a valve, at a holding tank, at a dewatering device, at a conveyance mechanism, at a blending chamber, at a collection container, at an ancillary water treatment process, or any other portion of the biosolids conversion system. Examples of sensors may comprise temperature sensors, pH sensors, image capture devices, motion detectors, depths measurement devices, pressure sensors, or any other type of sensors. In some instances, in response to a sensor measurement, a user may take an action. Optionally, the biosolids conversion system may automatically take an action without requiring user intervention. For example, one or more valves, inlets, outlets, conveyance mechanisms, blending blades, chemical conveyance mechanisms, container placement, or other components may be controlled by the system. Movement of the blending blades may be controlled with aid of one or more processors. For example, directionality and/or speed of rotation of blades may be controlled with aid of one or more processors. One or more components may be controlled with aid of one or more processors that may be local or remote to the components. Optionally, a cloud computing infrastructure may be utilized for monitoring and/or control of the biosolids conversion system. In some instances, a user may provide remote instructions for a component of the biosolids conversion system to take an action.

In some instances, based on sensor measurements, one or more alerts may be sent to a user. The alerts may be sent via a mobile electronic device or other device. The alerts may indicate when an error has occurred. The alert may indicate when a container is ready to be picked up and transported. The alert may indicate when a new batch has entered or exited a blending chamber.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., to provide a user with information regarding a biosolids conversion process). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables;

copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, information regarding a biosolids conversion process. In examples, the user interface may provide options for adjusting processing dynamics to increase temperature, pH, flow rate, and other aspects of the materials that are being processed. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, determine optimum conditions for processing wastewater and/or dewatered solids in the biosolids conversion system.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A wastewater treatment system, comprising:
   a dewatering system for removing water from a wastewater stream, thereby producing dewatered solids having between 25% and 50% solids;
   an oxidizing component for mixing said dewatered solids with an oxidizing chemical, thereby obtaining a dewatered solid-chemical mixture;
   a blending chamber operably connected to said oxidizing component, said blending chamber having a plurality of blades that are configurable to alternate in more than one direction, and wherein said blending chamber is configured to receive said dewatered solid-chemical mixture from said oxidizing component;
   a computer processor in communication with said blending chamber, wherein said computer processor is programmed to adjust rotational direction of said plurality of blades, wherein said computer processor is configured to (i) provide a first set of instructions to effect rotation of the plurality of blades in a first direction when an inlet to the blending chamber is open and (ii) provide a second set of instructions to effect rotation of the plurality of blades in a second direction different from the first direction when the inlet is closed and an outlet of the blending chamber is closed; and
   a collection component for receiving processed solids from said blending chamber.

2. The wastewater treatment system of claim 1, further comprising:
   a channel for diverting said removed water from said dewatering system;
   a water treatment component; and
   a channel for returning water discharged from said water treatment component to a greywater consumption source.

3. The wastewater treatment system of claim 1, wherein said blending chamber is configured to rotate said plurality of blades between 50 RPM and 2000 RPM.

4. The wastewater treatment system of claim 1, wherein said computer processor is configured to adjust rotational speed of said plurality of blades.

5. The wastewater treatment system of claim 1, wherein said computer processor is configured to provide a third set of instructions to effect rotation of the plurality of blades in the first direction when the inlet is closed and the outlet is opened.

6. The wastewater treatment system of claim 1, wherein said blending chamber comprises one or more temperature sensors operably coupled to an interior of the blending chamber, the one or more temperature sensors configured to measure a temperature to determine when mixing is complete.

7. The wastewater treatment system of claim 1, wherein the blending chamber is an extended length blending chamber.

8. The wastewater treatment system of claim 1, wherein said wastewater stream is provided from a high density source.

9. The wastewater treatment system of claim 8, wherein the wastewater treatment system is located on-site at the high density source.

10. The wastewater treatment system of claim 1, wherein the plurality of blades move material from the inlet of the blending chamber to the outlet of the blending chamber.

11. The wastewater treatment system of claim 1, wherein the oxidizing component is operably connected to the blending chamber via the inlet.

12. The wastewater treatment system of claim 1, wherein the collection component is operably connected to the blending chamber via the outlet.

13. The wastewater treatment system of claim 1, wherein the rotation of the plurality of blades in the first direction is configured to move the dewatered solid-chemical mixture from the inlet of the blending chamber to the outlet of the blending chamber.

14. The wastewater treatment system of claim 13, wherein the dewatered solid-chemical mixture is configured to move from the inlet of the blending chamber to the outlet of the blending chamber in less than 3 seconds.

15. The wastewater treatment system of claim 1, wherein a speed of the blade rotation is based on characteristics of the dewatered solid-chemical mixture.

16. The wastewater treatment system of claim 1, wherein the rotation of the plurality of blades in the second direction is configured to mix the dewatered solid-chemical mixture, thereby obtaining the processed solids.

17. The wastewater treatment system of claim 1, wherein the rotation of the plurality of blades in the second direction is maintained until the dewatered solid-chemical mixture is thoroughly mixed.

* * * * *